(12) United States Patent
Fujiwara

(10) Patent No.: US 6,499,775 B2
(45) Date of Patent: Dec. 31, 2002

(54) DOOR LATCH

(75) Inventor: Yasuto Fujiwara, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/796,683

(22) Filed: Mar. 2, 2001

(65) Prior Publication Data
US 2001/0019212 A1 Sep. 6, 2001

(30) Foreign Application Priority Data

Mar. 6, 2000 (JP) ........................................ 2000-060638

(51) Int. Cl.$^7$ ................................................. E05C 1/04
(52) U.S. Cl. .......................... 292/143; 292/40; 292/42; 292/137; 292/146
(58) Field of Search ............................ 292/40, 42, 143, 292/146, 145, 147, 150, 152

(56) References Cited

U.S. PATENT DOCUMENTS

| 1,774,330 A | | 8/1930 | Kaser | |
|---|---|---|---|---|
| 1,970,267 A | | 8/1934 | Bales | |
| 2,195,223 A | | 3/1940 | O'Connor | |
| 4,121,863 A | * | 10/1978 | Lawrence | 292/150 |
| 4,231,597 A | * | 11/1980 | Pelcin | 292/143 |
| 4,462,623 A | * | 7/1984 | Grant | 16/82 |
| 4,483,639 A | * | 11/1984 | McCandless, II | 292/252 |
| 5,139,291 A | * | 8/1992 | Schultz | 292/337 |
| 5,465,191 A | * | 11/1995 | Nomura et al. | 292/145 |
| 5,846,665 A | * | 12/1998 | Timmer et al. | 205/167 |

* cited by examiner

Primary Examiner—Anthony Knight
Assistant Examiner—Christopher Boswell
(74) Attorney, Agent, or Firm—Armstrong, Westerman & Hattori, LLP

(57) ABSTRACT

A door latch 100 comprises a housing 110 fixed to a hinged door, and a knob 140 is slidably guided within a slit 112 formed to the housing 110. A bolt 130 inserted to a bolt guide 120 is fixed to the knob 140 using a screw 160. The sliding movement of said knob 140 is limited by both end portions 112a and 112b of a slit 112, against which said knob 140 collides. A plastic damper 150 is equipped to the position of collision for muffling collision noise. A ball 136 providing detent for said bolt is also made of plastic, providing a further muffling effect.

5 Claims, 5 Drawing Sheets

DOOR LATCH

FIELD OF THE INVENTION

The present invention relates to a door latch used for locking a hinged door, and especially relates to a door latch used as the interior equipment of an aircraft.

DESCRIPTION OF THE RELATED ART

A hinged door is equipped for example to the opening area of a galley (cooking facility) or a toilet equipped as an interior member of an aircraft.

The locking mechanism of a hinged door applies a structure where a knob fixed to a sliding bolt is used to insert the bolt to a catch or to remove it therefrom. The bolt is slidably inserted to a bolt guide equipped to a housing, and the knob is formed to slide along a slit opened to the housing.

SUMMARY OF THE INVENTION

When a user holds the knob and slides it, the knob moves toward the end of the slit: formed to the housing, and stops when it collides to the end portion. Since the housing and the knob are formed of metal members to provide them necessary strength, the collision of the knob against the housing generates a large noise. Further, in order to prevent the bolt from moving around freely in the bolt guide and to maintain the bolt at a fully pulled-in position, a holding mechanism (detent) using a ball and a spring is equipped thereto. The detent structure also causes noise.

Since the interior members of the aircraft is positioned near the cabin, these noises reach the passengers on board, and causes problems such as awaking the passengers when they are sleeping.

Therefore, the present invention provides a door latch having a structure enabling to reduce the collision noise when opening/closing the door.

The door latch according to the present invention comprises a bolt guide mounted on a housing, a housing fixed to the door, a bolt inserted slidably to the bolt guide, a knob slidably guided by a slit formed to the housing, and a fastening means for connecting the knob and the bolt, wherein the area where the knob collides with the end portions of the slit formed to the housing is equipped with a plastic damper.

The door latch further comprises a hole with a bottom formed orthogonal to the axial line of the bolt at the rear end area of the bolt, a coil-spring inserted to the hole with a bottom, and a plastic ball biased by the coil-spring, wherein the bolt guide is equipped with a hole for receiving the ball.

DETAILED DESCRIPTION OF PREFERRED EMBODIMENTS

Figure 1:
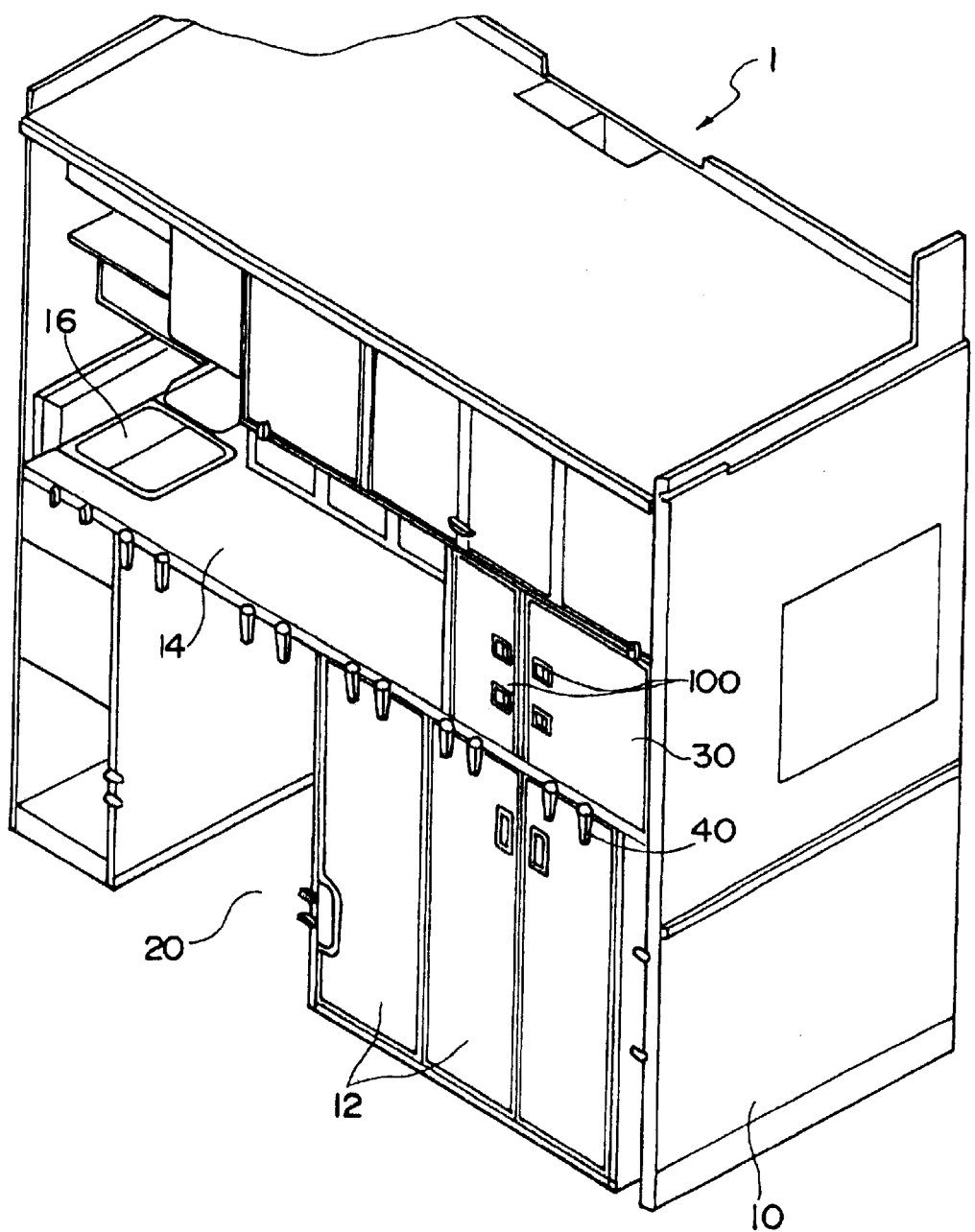
FIG. 1 is a perspective view of the galley in an aircraft applying the present invention.

FIG. 1 is a perspective view of a galley (cooking facility) equipped to a cabin of an aircraft to which is applied the present invention.

The galley shown as a whole by reference number 1 has a structure where a box-shaped body 10 is equipped with many storage units 12. Other than the storage units 12, the galley 1 includes for example a table 14 for preparing food, a counter 16 with a sink, and a space 20 for storing a service cart.

The opening of each storage unit is equipped with a hinged door 30, and each hinged door 30 is locked by a latch 100 and a stopper 40. This locking mechanism is required to be equipped in the galley to prevent objects stored in the storage units from falling out accidentally during flight.

Figure 2:
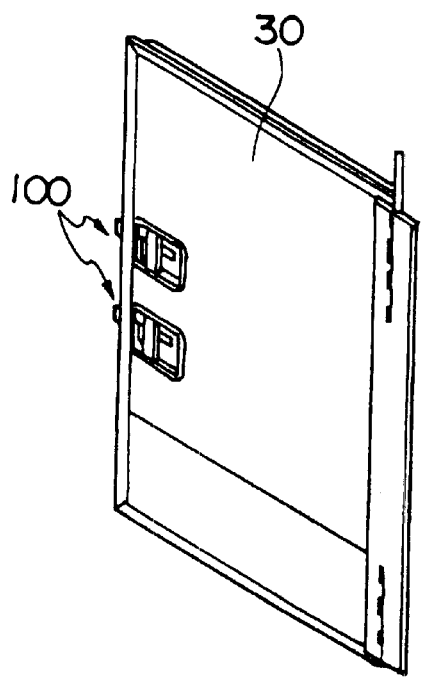
FIG. 2 is a perspective view of the front side of the hinged door.
Figure 3:
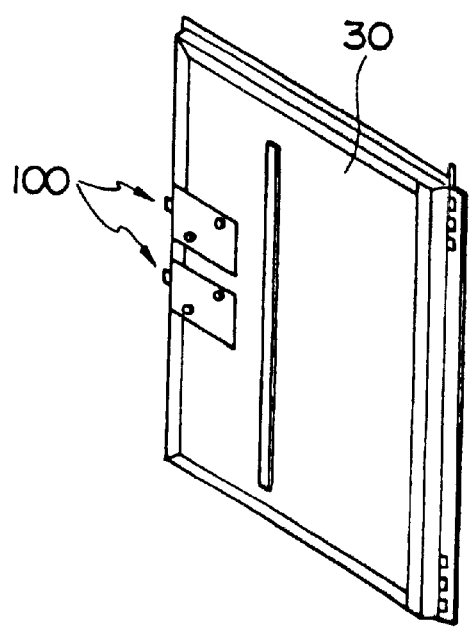
FIG. 3 is a perspective view of the back side of the hinged door.

FIG. 2 is a perspective view showing the front side of the hinged door, and FIG. 3 is a perspective view of the back side of the hinged door.

On one side end of the plate-shaped hinged door 30 is equipped the door latch 100. In the drawing, the door is equipped with two latches 100, 100.

Figure 4:
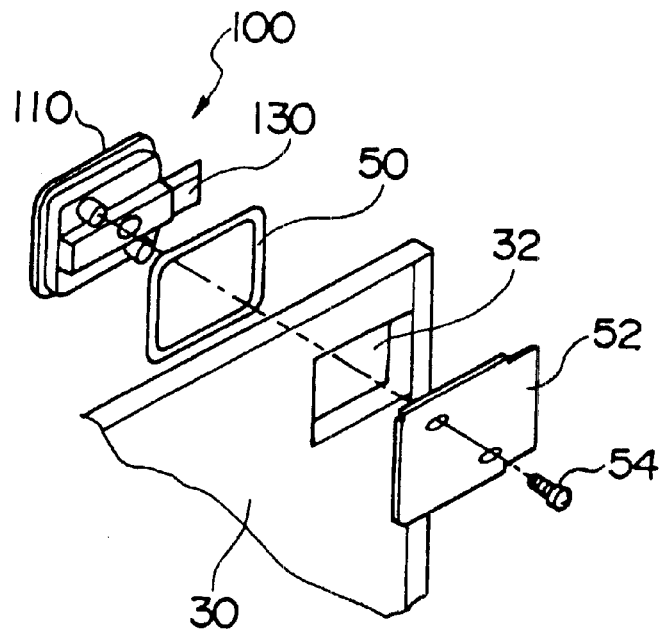
FIG. 4 is an explanatory view showing the mounting mechanism of the door latch.

FIG. 4 shows the mounting mechanism of the door latch 100 to the door 30. The door latch 100 is inserted to the opening portion 32 of the door 30 via a sealing member 50 and a back-metal 52, and two bolts 54 are used to fix the door latch 100 to the door 30.

Figure 5:
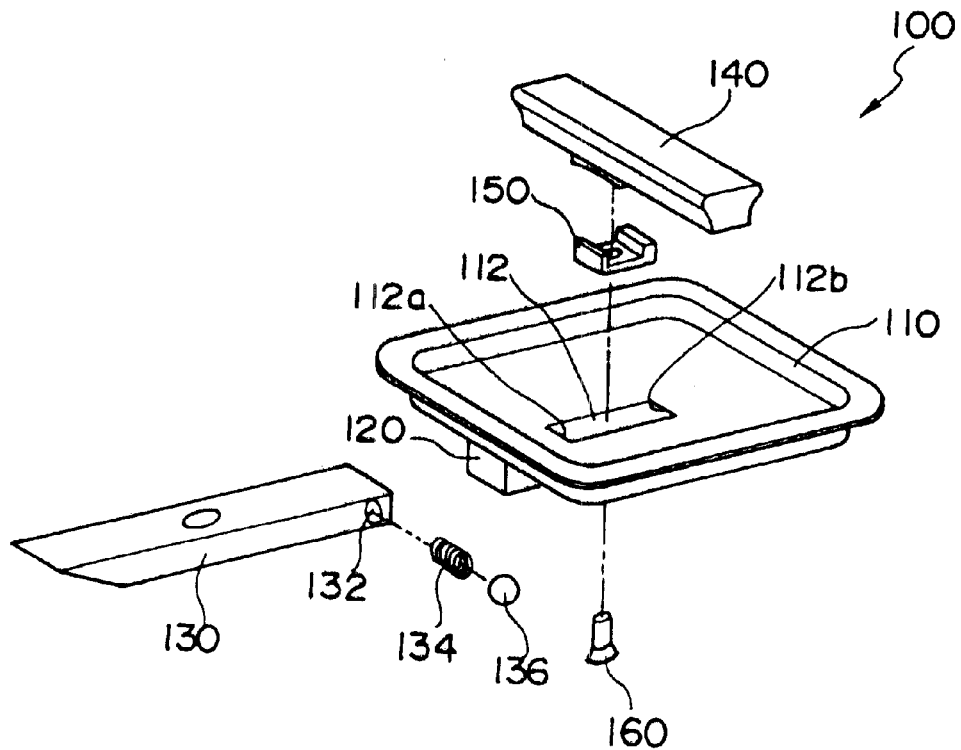
FIG. 5 is a view showing the parts assembly of the door latch according to the present invention.
Figure 6:
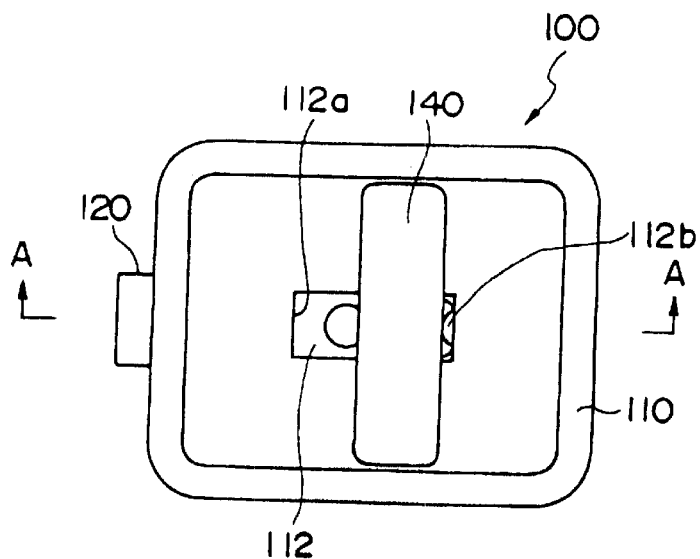
FIG. 6 is a front view of the door latch according to the present invention.
Figure 7:
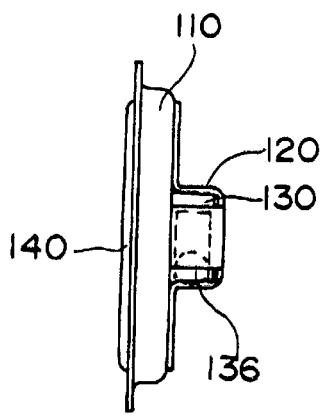
FIG. 7 is a right-side view of the door latch according to the present invention.
Figure 8:
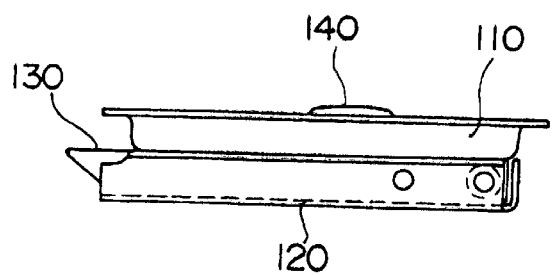
FIG. 8 is a bottom view of the door latch according to the present invention.
Figure 9:
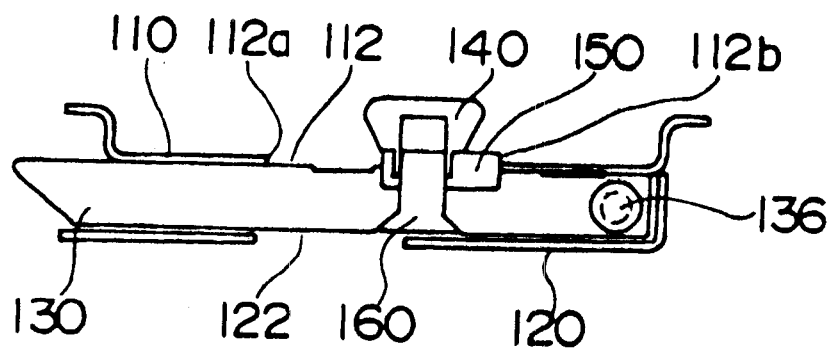
FIG. 9 is a cross-sectional view taken at line A—A of FIG. 6.
Figure 10:
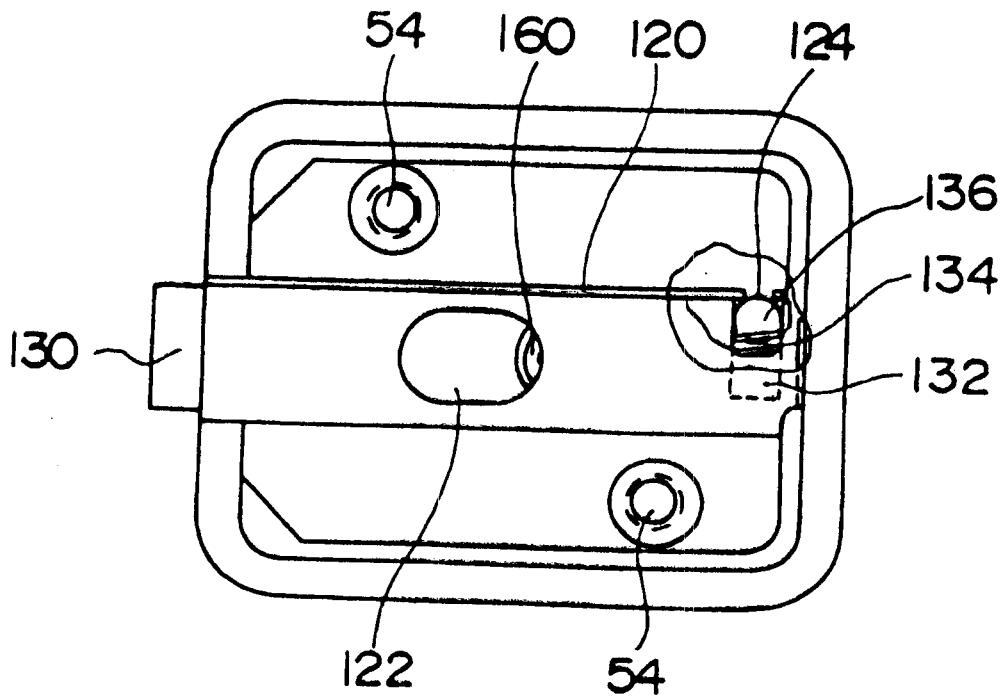
FIG. 10 is a back view of the door latch according to the present invention.

FIG. 5 is a perspective view of the members constituting the door latch 100, and FIG. 6 is a front view, FIG. 7 is a right side view, and FIG. 8 is a bottom view thereof. FIG. 9 is a cross-sectional view taken at line A—A of FIG. 7, and FIG. 10 is a back side view of the door latch.

The door latch 100 includes a lid-shaped housing 110, and at the center of the housing 110 is formed a slit 112. A pipe-like bolt guide 120 is fixed to cover the slit 112. A bolt 130 is slidably inserted to the bolt guide 120, and a knob 140 together with a damper 150 is fixed to the bolt 130 by a screw 160. The damper 150 is formed of an elastic material such as plastic. The knob 140 with the damper 150 slides within the slit 112 formed to the housing 110, thereby inserting the bolt 130 to, or pulling out the bolt 130 from, the opposing bolt catch.

Near the back end of the bolt 130 is formed a hole 132 with a bottom that is orthogonal to the axial direction of the bolt 130. A boll 136 is inserted to the hole 132 via a coil-spring 134. The ball 136 is formed of an elastic material such as plastic.

A hole 124 is formed to the side wall of the bolt guide 120 opposed to the ball 136 when the bolt 130 is at a completely inserted position inside the bolt guide 120. The hole 124 has a smaller diameter size than the diameter of the ball 136. Therefore, when the ball 136 is pushed into the hole 124 of the bolt guide 120 by the spring force of the coil-spring 134, the bolt 130 stays at the completely inserted position without moving around, until it receives a predetermined operation force, thereby creating a, so-called detent mechanism.

A portion of the bolt guide 120 is equipped with an opening 122 providing working space, and the attaching or removing of the screw 160 is performed by inserting work tools through this opening 122.

When operating the door latch 100, the user holds the knob 140 and pulls in or pulls out the bolt 130.

In the state shown in FIG. 6 and the following, the bolt 130 is pulled into the bolt guide 120, and the ball 136 is inserted to the hole 124 of the bolt 120 by the coil-spring 136. When the hinged door is closed and the knob 140 is biased towards the direction to push out the bolt 130 by a force exceeding the predetermined power, the ball 136 is pushed back from the hole 124 and removed therefrom, enabling the bolt 130 to be inserted to an opposing bolt catch (not shown).

The knob 140, together with the damper 150, collides against the end portion 112*a* of the slit 112 formed to the housing 110, and the movement of the bolt 130 is stopped.

Since the housing 110 is made of a metal plate, this collision generates a bumping noise. However, according to the present invention, the knob 140 is equipped with a damper 150, which exerts its dampening function when the knob collides against the end portion 112*a* of the slit, preventing the generation of a collision noise.

Therefore, according to the invention, the damper not only damps the collision when closing the latch but also reduces the bumping noise.

When opening the door latch, the user holds the knob 140 and biases it toward the opposite direction. The knob 140 together with the damper 150 moves toward the biased direction until it collides against the other end 112*b* of the slit 112, where the bolt 130 is pulled into the bolt guide and the ball 136 is pushed into the hole 124 of the bolt guide 120, thereby enabling the hinged door to be opened.

During this opening movement, two noises are caused; one noise caused when the knob 140 and the damper 150 collide against the end portion 112*b* of the slit 112, and the clicking noise when the ball 136 fits into the hole 124.

According to the present invention, the collision noise is reduced since a damper made of elastic material (plastic) is provided to the area where the knob collides with the end portion of the slit.

Moreover, since the ball 136 is also made of elastic material (plastic), the clicking noise it generates when inserted to the hole 124 is also effectively reduced.

As above, the door latch according to the present invention is equipped with a damper made of an elastic material (plastic) positioned to the areas where the knob collides to another member at both ends of its sliding passage, and the invention further applies a ball made of elastic material or plastic in the detent mechanism for holding the bolt in position. Therefore, according to the invention, the maneuverability of the door latch is improved and the collision noise when opening or closing the door is reduced.

According to experiment results, the noise generated by the door latch of the prior art is 72 decibel, wherein the noise generated by the door latch of the present invention is reduced to as much as 65 decibel.

I claim:

1. A door latch used in a locking mechanism for locking a hinged door, the door latch comprising:

a housing fixed to said door, a bolt guide mounted on said housing, a bolt inserted slidably in said bolt guide, a knob slidably guided by a slit formed in said housing, a fastener connecting said knob and said bolt, and a plastic damper where said knob collides with end portions of said slit formed in said housing.

2. The door latch according to claim 1, wherein said door latch further comprises a first hole having a bottom and extending orthogonal to an axial line of said bolt at a rear end area of said bolt, a coil-spring inserted in said first hole, a second hole in said bolt guide, and a plastic ball biased by said coil-spring, wherein said bolt guide second hole is for receiving said ball.

3. The door latch according to claim 1, wherein the plastic damper is held between the bolt and the knob.

4. The door latch according to claim 1, wherein the knob is slidably guided in the slit formed in the housing by the damper.

5. The door latch according to claim 1, wherein the damper is U-shaped.

* * * * *